Patented July 20, 1926.

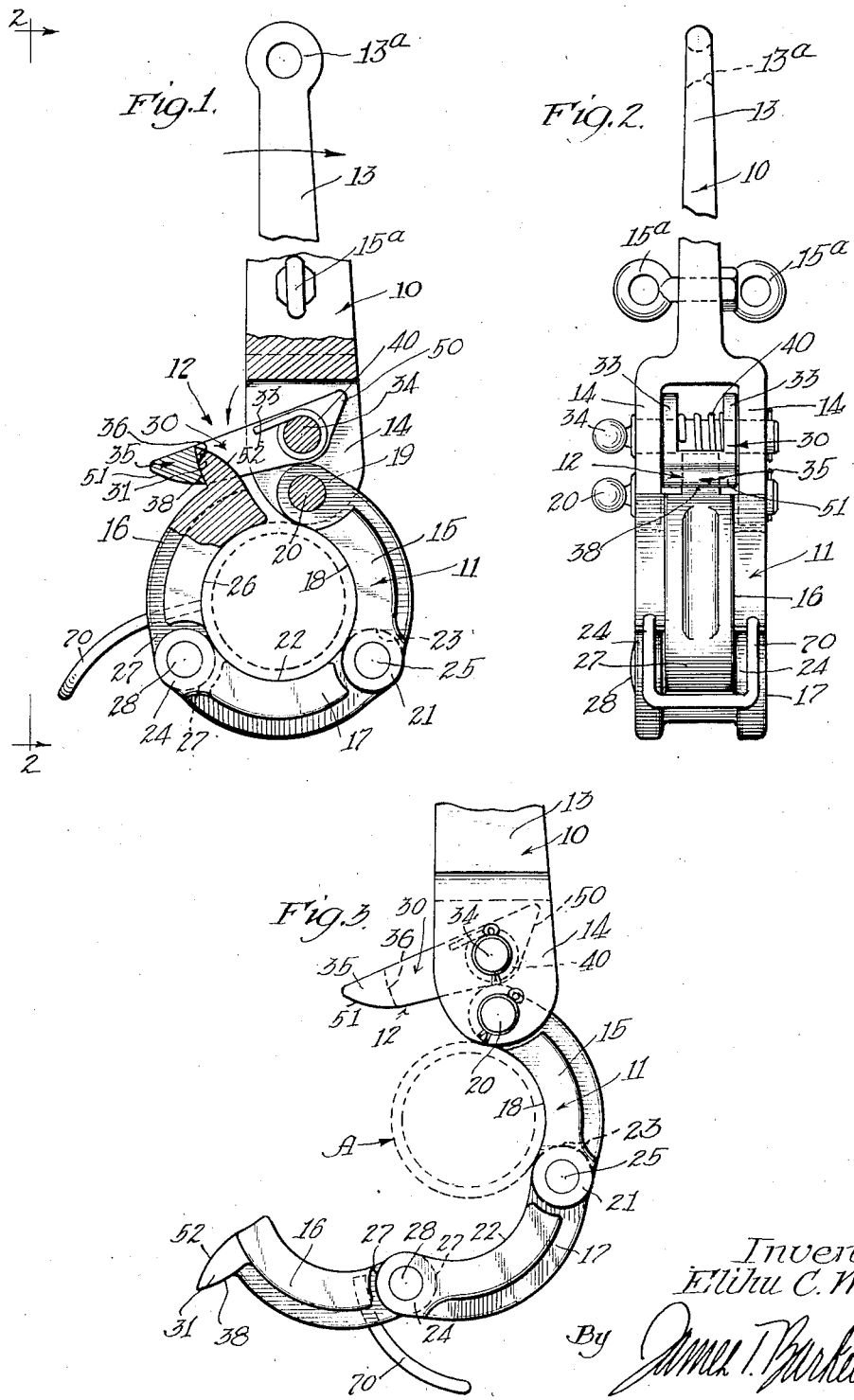

1,593,000

UNITED STATES PATENT OFFICE.

ELIHU CLEMENT WILSON, OF LOS ANGELES, CALIFORNIA.

TONGS.

Application filed December 27, 1921. Serial No. 524,937.

This application relates to tongs similar, generally, to the tongs set forth in my United States Patent No. 1,561,963, issued November 17, 1925, it being, however, directed to one particular form of tongs belonging to the class covered by said patent.

A distinctive feature of this invention is the provision of tongs with a spring latch for connecting the casing engaging parts around the casing, which latch is located between the lever and one end of the series of links which engages the casing. With this particular combination and arrangement the tongs can be opened and closed by moving a single series of links.

Another feature of the invention is the provision of a latch device between the lever and links by which the lever and links are connected without moving the lever. The latch device automatically catches when the series of links is arranged in operating position and will not release until actuated by the operator. The latch device is not dependent for its operation upon movement or manipulation of the lever and cannot be released by movements of the lever such as will cause the release of ordinary tongs. This makes the present tongs particularly safe and desirable for use as it is not necessary for the operator to keep constant pressure on the tongs in order to prevent their becoming released from the casing.

The various objects and features of the invention will be best and more fully understood from the following detailed description of a typical preferred form of the invention throughout which reference is had to the accompanying drawings in which—

Fig. 1 is a side elevation of the tongs with the links closed, or in operating position, certain parts being broken away to show in section; Fig. 2 is an edge elevation of the tongs, being a view taken as indicated by line 2—2 on Fig. 1; and Fig. 3 is a side elevation of operating portion of the tongs showing the links open so that the tongs can be placed on or removed from a casing.

The tongs provided by the present invention comprises, generally, a lever 10, a series of pivotally connected links 11, one end of the series being permanently pivotally connected to one end of the lever, and a catch device 12 for detachably connecting the other end of the series of links to the lever
10. The particular lever 10 which I illustrate in the drawings comprises a handle part 13, and a pair of spaced arms 14 extending from the inner end of the handle 13 longitudinally of the handle. The handle part 13 preferably tapers somewhat toward its outer end where it is formed with an eye 13ª. The arms 14, which are preferably formed integral with the handle part 13, are so spaced and shaped as to form a yoke for carrying one end of the series of links and a part of the catch mechanism by which the other end of the series of links is connected to the lever. For convenience in handling, eye bolts 15ª may be arranged to extend from the upper and lower sides of the handle at the center of gravity of the entire device. It will be readily understood, of course, that the present invention is not specifically limited to any particular form or construction of lever 10 and that in practice this part of the device will be subject to considerable variation in length, design, and general proportions, depending upon conditions of manufacture, use, etc.

The series of links 11, which, in effect, is a casing engaging or gripping mechanism, comprises three links, an inner link 15, an outer link 16 and a middle link 17, which connects the inner and outer links. The inner link 15 has a body part with an inner surface 18 curved to conform to the curvature of the outer surface of the casing on which the tongs is to operate, and is formed at its inner end with a lug part 19 which extends between the outer end portions of the arms 14. A pivot pin 20 extends between the outer end portions of the arms 14 and through the lug part 19 of the link 15 to permanently pivotally connect the inner link to the lever 10. A pair of spaced arms 21 extend from the outer end of the link 15 to form a yoke.

The middle link 17 has a body part with an inner surface 22 curved, like the surface 18 of the link 15, to conform to the curvature of the outer surface of the casing on which the tongs is to operate, and is formed at one end with a lug part 23 adapted to extend between the arms 21 of the link 15, and at the other end with a pair of spaced arms 24 which form a yoke. A pin 25 extends between the arms 21 of link 15 and through the lug 23 of link 17 to permanently, pivotally connect the links 15 and 17.

The outer link 16 has a body part with an inner surface 26 curved, like the surfaces 18 and 22 of the links 15 and 17, respectively, to conform to the curvature of the outer surface of the casing on which the tong is to operate, and is formed at one end with a lug 27 which extends between the arms 24 of link 17. A pin 28 extends between the arms 24 of link 17 and through the lug 27 of link 16 to permanently pivotally connect the links 16 and 17. The links 15, 16 and 17 being thus pivotally connected are capable of being opened out as illustrated in Fig. 2 for the purpose of receiving or discharging a casing and are capable of being swung in as illustrated in Fig. 1 so that they encircle a casing and so that their surfaces 18, 22 and 26 are concentric and are practically continuous. It is to be understood, of course, that the present invention is not limited to the series of links, or the casing engaging mechanism, comprising three links as it is obvious that various numbers of links may be employed in carrying out the invention, a construction involving three links simply being one which is simple, effective, and which may be employed advantageously. It is preferred in practice to construct the several links of the series so that they are substantially equal in length and it is desirable, from a commercial standpoint, to construct as many of them alike as possible so that they are interchangeable, etc. In the particular case which I illustrate in the drawings the links 15 and 17 are alike, the links 16 being of somewhat different construction as I will hereinafter describe. It may also be stated that in practice the inner surfaces of the several links are preferably made as long as possible, and may be constructed or formed in special manners so that they will be particularly effective in gripping and holding objects which are engaged by them when the device is being operated.

The catch device 12 is adapted to connect a part of the series of links with a part of the lever 10, which in the present case is the outer end of the outer link 15 and the arms 14 of the lever 10. The catch device comprises, generally, a latch 30 pivotally mounted on one of the parts to be connected, and a lug 31 extending from the outer part and adapted to be engaged by and to cooperate with the latch 30. In the particular construction illustrated in the drawings the latch 30 is connected to the arms 14 and comprises two spaced arms 33 the inner ends of which are pivotally connected to the arms 14 by a pivot pin 34 and the outer ends of which are spaced and connected by a cross part 35. Pivot 34 is located on lever 10 at a point spaced from pivot 20 and further removed from the handle end than is pivot 20. The inner or back surface 36 of the cross part 35 is curved concentrically with the pivot pin 34. The lug 31 is formed integral with the outer end portion of the link 16 and is located on the link 16 so that it will extend between the arms 33 of the latch 30 and behind the cross part 35 of the latch 30 when the links are in their closed position as illustrated in Fig. 1, and the latch 30 is swung to the position illustrated in Fig. 1. The rear surface 38 of the lug 31 is of the same curvature as the inner surface 36 of the cross part 35 and is adapted to be in engagement with the inner surface 36 of the cross part 35 when the parts are in the position just described. The pivot pin 34 connects the arms 33 of the latch 30 to the arms 14 at a point spaced inwardly of the pivot pin 20. When the links have closed and the latch 30 is in engagement with the lug 31 as illustrated in Fig. 1, the link 16 is effectively connected to the lever 10 and the device can be operated without causing, or tending in any way to cause, disengagement of the latch 30 and lug 31. The particular catch device which I herein set forth is fully described and claimed in my said issued patent.

A spring 40 is carried on the pivot pin 34 between the arms 33 of the latch 30 and has one end connected to the pivot pin and one end connected with the latch so that it continuously tends to move or swing the latch in the direction indicated by the arrow in Fig. 1. With the spring 40 yieldingly holding the latch 30 in position to cooperate with the lug 31 there is no possibility of the catch device becoming accidently released by vibration or jarring as it is necessary for the operator to positively and distinctly swing the latch in the direction opposite to that indicated by the arrow in Fig. 1, against the resistance of the spring 40 in order to disengage the latch and lug. For the purpose of causing the latch 30 to automatically cooperatively receive the lug 30, upon the links being moved from an open position such as is shown in Fig. 3 to the closed position shown in Fig. 1, the arms 33 are formed with extension 50 which engages the end of the handle 13 to limit the movement of the latch in the direction indicated by the arrow in Fig. 1, and the outer surfaces 51 and 52 of the cross part 35 and lug 31, respectively, are curved so that they cooperate to cause lifting of the latch, or swaying of the latch in the direction opposite to that indicated by the arrow in Fig. 1, upon the links being closed, to allow the cross part 35 to lift over the lug and drop behind it. This construction causes the catch device to operate automatically upon the closing of the links and make it unnecessary for the operator to manipulate the catch device in any way in order for it to be effectively closed or set in operating condition. It is to be particularly noted that the catch mechanism will operate to connect the link 16 with the lever 10 automatically upon the links being moved to their closed position and does not require any manipulation or movement of the lever 10. It is only necessary for the proper catching of the catch device that the handle 13 be in approximately the position illustrated in Fig. 1 of the drawings.

In operation the links are opened or swung out to a position such as is illustrated in Fig. 3 to permit of a casing, or the like, entering between them. When the casing is in place as indicated by the dotted lines A in Fig. 3 the links are swung inwardly to encircle it, or until their inner surfaces are in engagement with the outer surface of the casing. During movement of the links to their closed position the surface 51 of the cross part 35 is engaged by the surface 52 of the lug 31 causing the latch to be lifted until the cross part has passed over the lug when the latch immediately moves in the direction indicated by the arrow in Fig. 1 so that the cross part is back of the lug. When the links are closed on a casing and the catch device has operated to connect the link 16 and lever 10, movement of the handle 14 in the direction indicated by the arrow in Fig. 1 will cause the links to constrict and grip the casing. In practice I prefer that the lever 13 be positioned during the closing of the links so that the cross part of the latch 30 will swing into place back of the lug 31 just as the links reach their closed position. After the cross part 35 of the latch is back of the lug 31, no movement of the lever 13 can cause the links to be disconnected from the lever but movement of the handle 15 in the direction indicated by the arrow in Fig. 1 from the position just described will cause the several links to grip and turn the casing. With the construction provided by the present invention there is practically no lost motion, as soon as the catch device has actuated to connect the outer link and lever movement of the handle in the direction indicated in Fig. 1 will cause immediate gripping of the casing by the links. The present device operates in much the same manner as does the device set forth in the first mentioned patent in that the casing engaging mechanism is positively set or locked on the casing when it is at once arranged in place thereon, the connection of the casing engaging mechanism does not depend upon manipulation of the handle 13, and very little movement of the lever after the setting of the casing engaging mechanism will cause gripping of the casing by the casing engaging mechanism.

When it is desired to release the links from the casing the latch 30 can be lifted out of engagement with the lug 31 against the resistance of spring 40 whereupon the links can be freely swung from the closed position to an open position such as I illustrate in Fig. 3. The curved part 35 of the latch forms a convenient handle which may be gripped by the operator when lifting the latch out of engagement with the lug 31. When the links have been opened out to a position such as is shown in Fig. 3 the tong can be very easily removed from or placed on a casing. For convenience in swinging the links between the closed position shown in Fig. 1 to an open position such as is shown in Fig. 3, I provide a handle 70 on the outer link 16. It will be obvious how an operator can grip the handle 70 and easily and conveniently manipulate the links in the manner above described.

In actual practice casing tongs of the character herein set forth are actuated by what is known as a jerk line, which in turn is actuated by an engine. The line is attached to the eye 15 in the end of the handle and the tong is held in the derrick by means of a line attached to one of the eye bolts 15a. A light line is attached to a clevis or eye bolt attached to the handle. The operator draws the lever backward, through an angle of about 90° after which the jerk lines, actuated by the engine, draws it forward, causing the gripping mechanism, or links, to take hold upon the pipe or casing and turn it about one quarter of a turn. The amount the lever, and therefore the casing, is moved depends upon the stroke of the jerk line and upon the leverage the jerk line has upon the handle. The direction in which the casing is turned depends upon the arrangement of the tongs and the direction of pull of the jerk line. The operator then draws the tong back again and the operation is repeated until the joint is set up tight, or is disengaged, as the case may be. If ordinary tongs are accidentally loosened they frequently disengage and then, the engine running ahead at high speed, the tongs are thrown with great force directly at the operator, resulting frequently in serious accidents. This invention completely averts this danger in that it makes it impossible for the tongs to become detached from the casing and thus thrown in a manner to injure the operator standing out of the path of the handle.

Having set forth only a typical preferred form of my invention, I do not wish to limit myself to the particular details hereinabove set forth but wish to reserve to myself any changes or variations that may appear to those skilled in the art or that may fall within the scope of the following claims.

Having described a preferred form of my invention, I claim:

1. A pipe tongs, comprising a lever, a series of pivotally interconnected curved links, one end of the series being pivotally connected to the lever at one end, a spring actuated latch member pivoted to the handle at a point removed from the first mentioned pivotal point and further from said end of the handle than is the first mentioned pivotal point, a latching lug on and near the end of the link at the free end of the series, the handle pivoted link, when the links are around a pipe, extending to one side of the lever and the latch member extending to the opposite side of the lever and in such position adapted to engage outside the latching lug, a spring urging the latch member toward the pipe, a stop limiting such movement, and said member and lug having interengageable faces acting to raise said member and allow the lug to pass beneath it when the links are swung about a pipe.

2. A pipe tongs, comprising a lever, a series of pivotally interconnected curved links, one end of the series being pivotally connected to the lever at one end, a spring actuated latch member pivoted to the handle at a point removed from the first mentioned pivotal point and further from said end of the handle than is the first mentioned pivotal point, a latching lug on and near the end of the link at the free end of the series, the handle pivoted link, when the links are around a pipe, extending to one side of the lever and the latch member extending to the opposite side of the lever and in such position adapted to engage outside the latching lug, a spring urging the latch member toward the pipe, a stop limiting such movement, and said member and lug having interengageable faces acting to raise said member and allow the lug to pass beneath it when the links are swung about a pipe, the lug having a latching shoulder on its side away from the lever and the latching member having a cooperating shoulder facing the lever, and at least one of said shoulders being curved and concentric with the pivot of the latching member.

In witness that I claim the foregoing I have hereunto subscribed my name this 15th day of December 1921.

ELIHU CLEMENT WILSON.